Aug. 5, 1969 D. I. ALSTER ET AL 3,459,900
VISUAL CALL INDICATOR FOR TELEPHONE SETS
Filed Nov. 1, 1966 2 Sheets-Sheet 1

CONVENTIONAL TERMINALS

INVENTORS
David I. Alster &
Jacob H. Eggert
BY
Michael [signature]
ATTORNEY

VISUAL CALL INDICATOR FOR TELEPHONE SETS

Filed Nov. 1, 1966 2 Sheets-Sheet 2

INVENTORS.
DAVID I. ALSTER
JACOB H. EGGERT
BY
ATTORNEY

United States Patent Office 3,459,900

Patented Aug. 5, 1969

3,459,900
VISUAL CALL INDICATOR FOR TELEPHONE SETS

David I. Alster, 19 Barry Drive, Westbury, N.Y. 11590, and Jacob H. Eggert, 211 Golf Road, Deal, N.J. 07723

Filed Nov. 1, 1966, Ser. No. 591,187
Int. Cl. H04m 1/00
U.S. Cl. 179—84 4 Claims

ABSTRACT OF THE DISCLOSURE

An auxiliary visual indicator which is attachable to a standard telephone set and which is activated only when the ringing bell is activated to afford concurrent visual and sound signals, thereby making it possible to properly identify the set having an incoming call. The indicator includes an electric lamp in series with a current- limiting resistor connected across the terminal binding posts of the set.

This invention relates generally to telephone call indicators, and more particularly to an auxiliary visual indicating device which is attachable to the binding posts of a telephone set to provide light signals concurrently with ringing signals.

The typical field telephone set in widespread use in military communication systems as well as for other purposes consists essentially of a telephone transmitter and receiver in handset form, a signal bell and a transformer. The transformer serves to match the receiver to the line as well as to keep direct-current out of the receiver windings. Removing the handset from its cradle serves to close switch contacts connecting the instrument across the line, the line being connected to terminals or binding posts on the set.

The various telephone sets in a given installation are generally connected to a common switchboard, and when the handset of a particular field telephone is lifted from its cradle to make a call, and the instrument is thereby connected across the line, a circuit is completed through the transmitter and the transformer primary which causes a signal lamp associated with this telephone to light on the switchboard. Incoming calls are indicated by an alternating current calling signal which is sent over the line to energize the ringer of the telephone set.

In some instances, several field telephone sets may be grouped together at the same station, particularly at a command post. When, therefore, a particular set rings to indicate an incoming call, one cannot on the basis of the sound, immediately identify the active set, for the bells of all sets emit essentially the same sound.

It becomes necessary, therefore, to pick up one handset after another until the ringing telephone is located. This procedure is confusing, inefficient and time consuming, and in the case of military operations it may have serious consequences. The confusion may be further compounded if two or more of the sets are ringing simultaneously.

Accordingly, it is the main object of this invention to provide an auxiliary visual indicator which is attachable to a standard telephone set and which is activated only when the ringing bell is activated to afford concurrent visual and sound signals thereby making it possible positively to identify the set having an incoming call.

More specifically, it is an object of the invention to provide an auxiliary visual indicator which may readily be plugged on or connected to the binding posts of a telephone set and which includes an electric lamp in series with a current-limiting resistor.

Also an object of the invention is to provide a visual indicator of the above type which may be mass-produced at low cost and which lends itself to quick installation on existing telephone sets without any circuit changes therein.

For a better understanding of the invention as well as other objects and further features thereof, reference is made to the following detailed description to be read in conjunction with the accompanying drawings, wherein.

Figure 1:
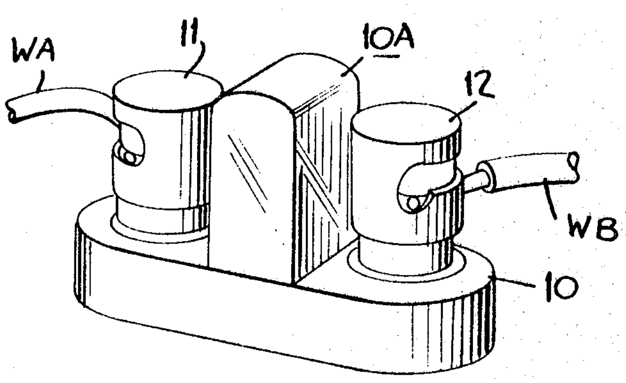
FIG. 1 shows the binding post on a standard telephone set.

Referring now to the drawings and more particularly to FIG. 1, the terminals of a telephone set are shown. The circuit of the telephone set may be of any conventional type and constitutes no part of the present invention. The set includes the usual transmitter and receiver, as well as a bell ringer which is energized by an alternating-current signal sent over the line connected to the terminals.

The terminals of the telephone set are constituted by an insulating strip 10 formed of a suitable opaque plastic material, on which are mounted two binding posts 11 and 12, the strips having an upstanding portion 10A interposed between the posts to isolate the live wires WA and WB from each other. The posts are of standard design and include an inner rod (11A and 12A) having a threaded extension (11B and 12B) threadably received in the mounting strip 10. A cap (11C and 12C) is fitted on top of the inner rod and is spring-biased whereby when the cap is depressed, an exposed wire may be inserted into a lateral opening in the rod through a slot in the cap.

Figures 2, 3:
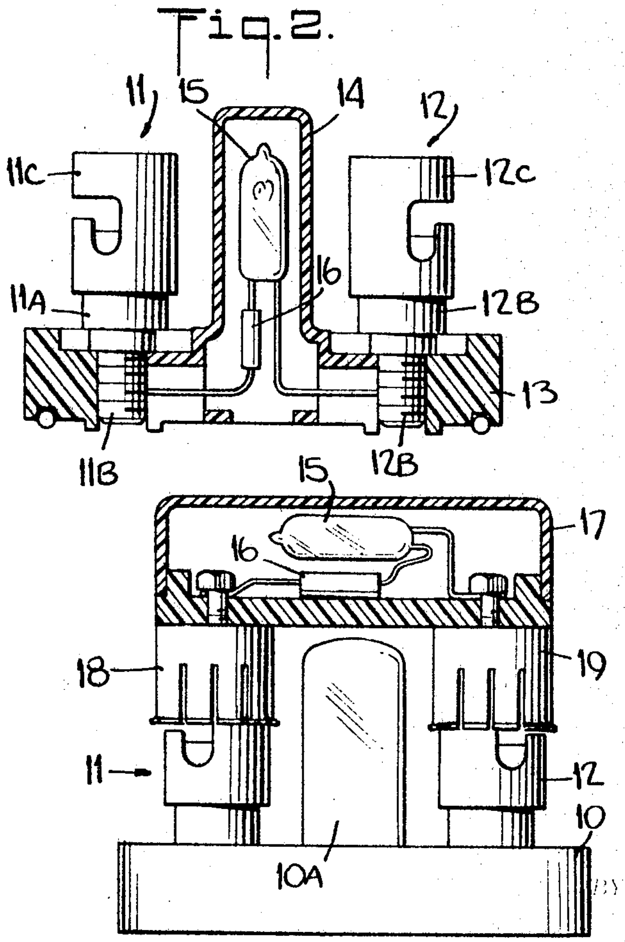
FIG. 2 illustrates, in section, a preferred embodiment of an auxiliary visual indicator in accordance with the invention.
FIG. 3 shows in perspective view, another preferred embodiment of a visual indicator in accordance with the invention.

To provide this telephone set with an auxiliary visual indicator device, strip 10 is removed and replaced by the device which includes, as shown in FIG. 2, an insulating base 13, adapted to receiving binding posts 11 and 12, the dimensions of the base matching that of the replaced strip. However, in lieu of the upstanding portion 10A, the device includes a transparent housing 14, which is secured to base 13 and is interposed between the binding posts.

Within the housing, which may be made of a suitable plastic material, such as a polystyrene or acrylic plastic, there is contained an indicator lamp 15 and a current-limiting resistor 16 whose electrical ratings are appropriate to the voltage of the A-C ringing signal. The lamp 15 and resistor 16 are connected in series to the threaded shanks 11B and 12B of binding posts 11 and 12.

Thus in operation, when a ringing signal is transmitted over the line, the signal not only energizes the ringing bell of the telephone set, which is connected across the binding posts but it activates lamp 15 as well, thereby providing concurrent light and sound indications, making possible positive identification of the set being called. It will be appreciated that the lamp housing arrangement not only serves to emit a visual signal but also functions to prevent a short circuit between the ends of the line, for the housing isolates the binding posts wire from each other.

Figure 4:
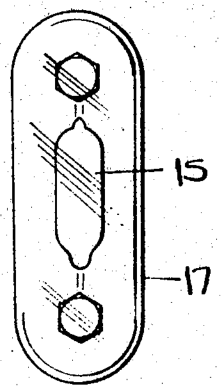
FIG. 4 is a plan view of device shown in FIG. 3.

In the embodiment shown in FIGS. 3 and 4, existing terminals of the telephone set need not be altered as in the case of the embodiment shown in FIG. 2. In this instance, the lamp 15 and resistor 16 are contained within a transparent flat rectangular housing 17 having a pair of metallic crowns 18 and 19 secured to the underside thereof. The series consists of the lamp 15 and resistor 16 and is connected between crowns 18 and 19.

The crowns are slotted to form spring fingers, and they are positioned to register with the caps of binding posts 11 and 12, whereby they may be readily forced thereon. Thus to provide the set with a visual indicator, the device shown in FIGS. 3 and 4 is simply snapped onto the binding posts, such that when a ringing signal is received, a light indication will be emitted from housing 17 lying over the posts.

Figure 5:
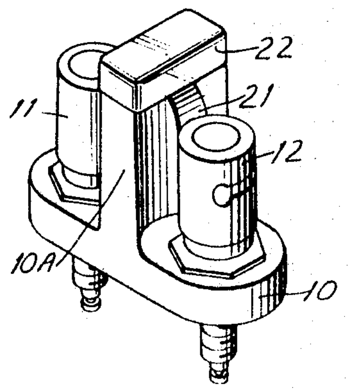
FIG. 5 is a perspective view of still another embodiment of a visual indicator.
Figure 6:
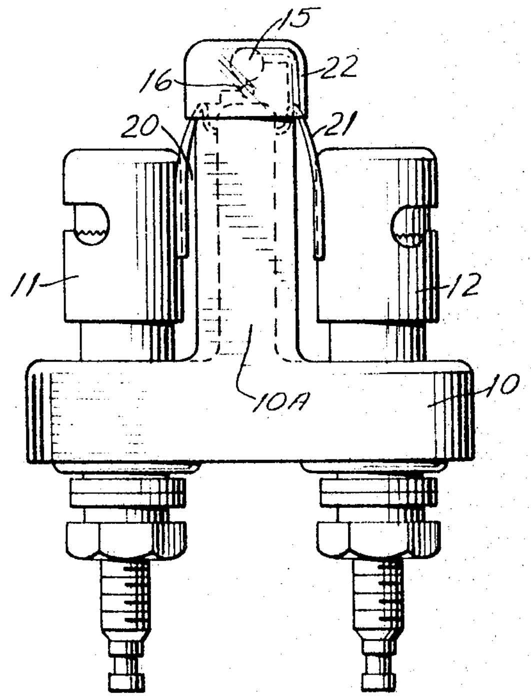
FIG. 6 is a side view of the indicator shown in FIG. 5.
Figure 7:
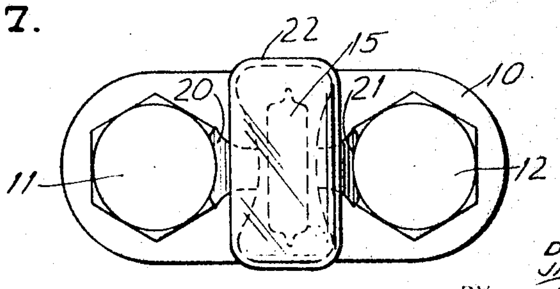
FIG. 7 is a plan view thereof.

In the embodiment of the indicator shown in FIGS. 5, 6 and 7, the existing terminals of the telephone set need not be altered, as in the case of the device shown in FIG. 2. In this instance, however, the indicator does not snap over the binding posts 11 and 12, as in the embodiment of FIGS. 3 and 4, but rests on the upstanding portion 10A, and makes electrical contact with the posts by means of flat spring fingers 20 and 21 which are received between the upstanding portion and the binding posts and physically engage the binding posts to make electrical contact therewith. In this way, it becomes possible for the user to depress either of the binding posts for wire insertion without removing the indicator from the terminal.

The lamp 15 and resistor 16 are disposed within a rectangular housing 22 whose dimensions conform to those of the upstanding portion 10A, the lamp and resistor being connected serially between the inner ends of the spring fingers which project downwardly from the housing. Thus the indicator may readily be attached to any existing telephone terminal without interfering with the ability to make wire connections to the binding posts.

While there have been shown preferred embodiments of visual call indicator in accordance with the invention, it is to be understood that other modifications are possible within the scope of the invention, and it is intended in the appended claims to cover all such modifications as fall within the true spirit of the invention.

What we claim is:

1. A visual indicating device for a field telephone set provided with terminals for connecting a line to convey an incoming call signal to a ringing bell in the set, said terminals including a pair of binding posts mounted on an insulating strip having an upstanding portion interposed between said posts, said device comprising an insulating base adapted to replace said strip, said posts being then mounted on said base, an electric lamp, a current limiting resistor, a transparent housing enclosing said lamp and resistor, said housing being secured to said base between said posts to isolate wires connected to said posts from each other, and means to connect said lamp and resistor serially between said posts.

2. A visual indicating device for a field telephone set provided with terminals for connecting a line to convey an incoming call signal to a ringing bell in the set, said terminals including a pair of binding posts mounted on an insulating strip having an upstanding portion interposed between said posts, said indicating device comprising a transparent insulated housing bridging said binding posts and provided at its underside with a pair of conductive crowns adapted removably to fit onto the top of said binding posts, an electric lamp, and a current limiting resistor, said lamp and resistor being enclosed in said housing and being serially connected between said crowns.

3. A device as set forth in claim 2, wherein said binding posts include depressible caps, and said crowns are slotted to define spring fingers to engage said caps.

4. A visual indicating device for a field telephone set provided with terminals for connecting a line to convey an incoming call signal to a ringing bell in the set, said terminals including a pair of binding posts mounted on an insulating strip having an upstanding portion interposed between said posts, said device comprising a transparent housing resting on said upstanding portion and having a pair of spring fingers projecting downwardly therefrom which engage said posts to make contact therewith, an electric lamp and a current limiting resistor, said lamp and resistor being enclosed in said housing and being serially connected between said fingers.

References Cited

UNITED STATES PATENTS

| | | |
|---|---|---|
| 2,278,504 | 4/1942 | Wingardner. |
| 2,562,069 | 7/1951 | Stein et al. |

WILLIAM C. COOPER, Primary Examiner

W. A. HELVESTINE, Assistant Examiner

U.S. Cl. X.R.

179—1